Jan. 5, 1943.  D. S. WILLSON  2,307,314
FLUID DISPENSING APPARATUS
Filed Dec. 1, 1941
FIG. I.
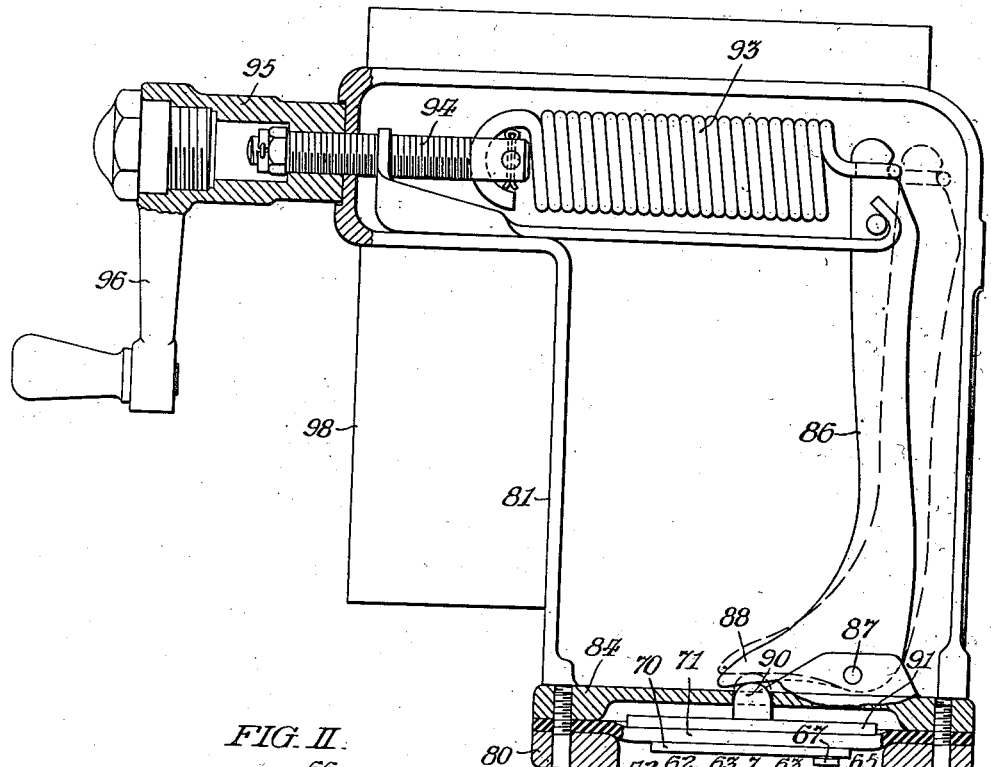
FIG. II.
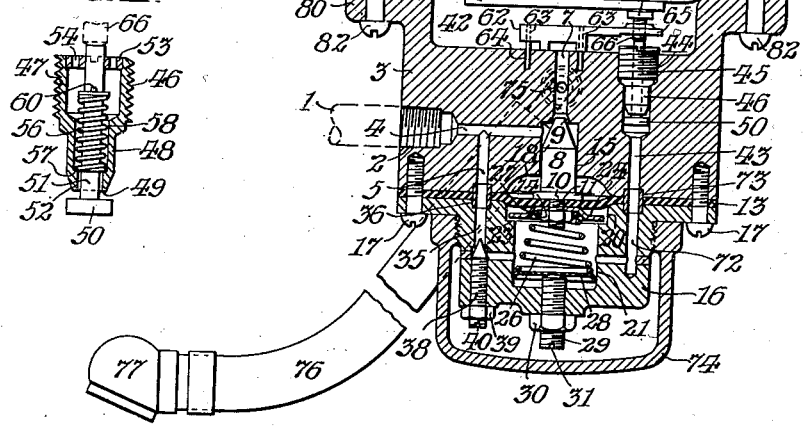
INVENTOR:
DAVID S. WILLSON,
BY
ATTORNEY.

Patented Jan. 5, 1943

2,307,314

UNITED STATES PATENT OFFICE 2,307,314

FLUID DISPENSING APPARATUS

David S. Willson, Muskegon Heights, Mich., assignor to John Wood Manufacturing Company, Inc., Philadelphia, Pa., a corporation of Delaware Application December 1, 1941, Serial No. 421,156

3 Claims. (Cl. 221—73.5)

My invention relates to devices for controlling the delivery of air under pressure in pulsations from a source of supply of compressed air to a receiver, for instance, an automobile tire. My invention includes means to variably predetermine the pressure to which the receiver is to be inflated and to automatically shut off the delivery of air to the receiver when the pressure in the receiver reaches the predetermined pressure.

One feature of my invention is the use of a diaphragm to carry the main valve, thereby eliminating the troublesome close-fitting piston valves of the prior art devices of this type.

Another feature of my invention is the use of a loose fit between the main air valve and its guide.

Another feature of my invention is the provision of adjustable means for controlling the opening and closing of the main valve.

Another feature of my invention is the provision of adjustable means for varying the spring loading of the main valve.

My invention includes the various novel features of construction and arrangement hereinafter more definitely specified.

Fig. I is a vertical sectional view, partly in elevation, of a tire inflating device embodying my invention.

Fig. II is an enlarged vertical sectional view, partly in elevation, of the inflating valve shown in Fig. I.

Referring to said drawing, a source of air under high pressure, say 125 to 150 pounds per square inch, is connected by suitable piping 1 to the screw threaded air inlet port 2 formed in the body casing 3 of my improved tire inflator. The air inlet port 2 is in communication with the air passageway 4, which has in communication therewith the branch air passageway 5. The air inlet passageway 4 is in communication with the air passageway 7 under control of the main valve 8 which is arranged to control communication between said passageways 4 and 7. Communication between said passageways 4 and 7 is shut off by a seating of the valve 8 in the valve seat 9 formed at the lower end of said passageway 7.

The valve 8 is provided with the enlarged portion 10 adjoining its screw threaded reduced stem portion 11, the latter extending through an opening formed in the spring loaded diaphragm 13. The valve 8 is rigidly fastened to and carried by said diaphragm 13 by means of the nut 14 which engages the screw threaded stem 11 of the valve 8. Flexing of the diaphragm 13, as hereinafter described, moves the valve 8 which is loosely fitted in its guide 15, formed in the casing 3.

The outer portion of the diaphragm 13 is clamped between the casing 3 and the main valve cover 16, conveniently by a series of screws 17 which extend through matching holes in the cover 16 and diaphragm 13 into engagement with screw threaded openings formed in said casing 3. Said casing 3 is provided with the recess 18 which permits flexing movement of that portion of the diaphragm 13 which is within said recess.

The main valve cover 16 is provided with the axially aligned annular recesses 20 and 21, the latter being smaller in diameter than the opening 20, thus forming the shoulder 23 which acts as an abutment to limit the downward movement of the stop plate 24. The stop plate 24 is carried by the screw threaded valve stem 11 and rigidly mounted thereon between the diaphragm 13 and the nut 14 by means of which the valve 8 is rigidly fastened to said diaphragm 13.

The diaphragm 13 is spring loaded by means of the coiled spring 26 mounted in the recess 21 formed in the main valve cover 16. One end of said spring 26 is seated in the annular recess 27 formed in the stop plate 24 connected to said diaphragm, and the opposite end of said spring 26 is in engagement with the spring follower 28 which is loosely positioned in said recess 21, the walls of which act as a guide for said follower and spring. Said spring is arranged to be adjusted manually by means of the adjusting screw 29, the inner end of which extends through a screw threaded opening formed in the main valve cover 16 into engagement with the underside of the spring follower 28. Said adjusting screw 29 is locked in adjusted position by means of the lock nut 30 engaging the opposite end of said screw 29. The outer end of said screw 29 is provided with the slot 31 for conveniently effecting adjusting movement of said screw.

The main valve cover 16 is provided with the L-shaped drilled air passageway 35 which is in communication at one end with the air passageway 5 through the dowel tube 36 mounted in the diaphragm 13. The respective opposite ends of said dowel tube 36 extend into the passageways 5 and 35 to facilitate the assembly of the casing 3 and cover 16 with the passageways 5 and 35 in axial alignment. Said air passageway 35 is in communication at its opposite end with the chamber formed at the underside of the diaphragm by the annular recesses 20 and 21. The effective area of the air passageway 35 is arranged to be varied by means of the manually adjustable orifice screw 38 which is mounted in the screw threaded opening formed in the main valve cover 16. Said orifice screw 38 is in axial alignment with the vertical portion of the L-shaped passageway 35, and the pointed end of said orifice screw 38 is arranged to be adjustably moved in said vertical portion of the air passageway 35 to variably restrict the effective opening of said passageway. Said orifice screw 38 is locked in adjusted position by means of the lock nut 39 which engages the outer end of said orifice screw 38. The outer end of said orifice screw 38 is provided with the slot 40 for conveniently effecting adjusting movement of said screw.

The casing 3 is provided at its upper end with an annular recess forming the main diaphragm chamber 42 with which the air passageway 7 is in open communication. The casing 3 has the air passageway 43 therethrough, the upper end 44 of which is enlarged and provided with the screw thread 45. The inflating control valve assembly 46 is mounted in screw threaded engagement in said screw threaded upper end 44 of the air passageway 43. As best shown in Fig. II, the inflating control valve assembly 46 includes a hollow housing shell 47 which has at its lower end a reduced portion 48, the lowermost end of which forms the valve seat 49 for the valve 50. The valve 50 includes the valve stem 51 which extends through the opening 52 in said reduced portion 48. The upper end of the valve stem 51 is mounted in the top closure plate 53 of said valve housing 47 and said plate 53 is provided with a series of openings 54 therethrough. The valve 50 is continually stressed toward closed position by means of the spring 56 which encircles the valve stem 51. The lower end of the spring 56 is seated on the shoulder 57 of the cylindrical recess 58 formed in the reduced portion 48 of the valve housing shell. The upper end of said spring 56 engages the pin 60 which extends through the valve stem 51, transverse to its axis.

The lever yoke 62 is mounted in the bottom of the chamber 42 and retained in position conveniently by the pins 63 which loosely engage openings 64 formed in the bottom of the chamber 42. The yoke lever 62 is provided with the arm 65 which carries in screw threaded relation therewith the stud 66 in axial alignment with the stem 51 of the valve 50. The upper end of the screw stud 66 is enlarged to form the head 67 which is adapted to be engaged by the plate 70, attached to the main diaphragm 71, when the diaphragm 71 is in the depressed position shown in Fig. I, to cause said stud 66 to move the valve 50 to open position.

The air passageway 43 is in communication at its lower end with the L-shaped air passageway 72, through the dowel tube 73 mounted in said diaphragm 13. The respective opposite ends of said dowel tube 73 extend into the passageways 43 and 72 to facilitate the assembly of the casing 3 and cover 16 with the passageways 43 and 72 in axial alignment. Said air passageway 72 is in communication at its opposite end with the chamber formed at the underside of the diaphragm 13 by the annular recesses 20 and 21.

The L-shaped passageways 35 and 72 are formed conveniently by drilling the main valve cover 16 at right angles to the axis of the vertical portions of said passageways 35 and 72 and plugging the outer ends of such transversely drilled holes.

The main valve cover 16 carrying the adjusting screws 29 and 38, is conveniently protected by a cap 74 which is in screw threaded engagement at its upper end with a screw thread formed on said main valve cover 16.

The passageway 7 is in communication with the air outlet passageway 75 formed in the casing 3. Said air outlet passageway 75 is enlarged at its outer end and screw threaded for connection by convenient means to the dispensing hose 76 which carries at its distal end an air chuck 77 of the well-known conventional type, including a valve which is maintained closed by air pressure in the hose 76 and which valve is adapted to be opened by the operator pressing the chuck against the ordinary valve stem of an automobile tire.

The casing 3 is provided at its upper end with the flange 80. The outer portion of the main diaphragm 71 is clamped between the casing 3 and the upper hollow housing 81, conveniently by a series of screws 82 which extend through matching holes in said flange 80 and main diaphragm 71 into engagement with screw threaded openings formed in the base portion 84 of said housing 81.

The controlling mechanism for the valve 8 includes the lever 86 which is fulcrumed at 87 in the base portion 84 of the housing 81. The short arm 88 of said lever 86 is in contact with the axial stud 90 projecting upwardly from the plate 91 which rests upon the flexible main diaphragm 71. The upper end of said lever 86 is in engagement with one end of the spring 93, the opposite end of which engages the spring adjusting screw 94 which extends through the side wall of the housing 81 in engagement with the nut 95, which is provided with the handle 96 by which said nut may be turned to vary the stress upon said spring 93 and in consequence upon said lever 86. Such adjustment is effected by axial movement of said screw 94 without rotation of the latter when said handle 96 is manually turned.

The screw 94 carries a pin which actuates an indicating device by which the operator can determine visibly the pressure at which the device is set to deliver air to the tire or other receiver to be inflated, in accordance with the setting of the spring 93. Such indicating mechanism is shown in Letters Patent No. 2,126,693 granted to me August 9, 1938, for improvement in Fluid dispensing apparatus. I have indicated by the reference mark 98 the reverse side of the dial, similar to the dial shown in said Letters Patent No. 2,126,693, which has upon its opposite face numbered graduations representing the pressure of pounds per square inch to which the tire, or other receiver, will be inflated by the automatic operation of the mechanism.

*Operation*

My tire inflating apparatus operates as follows: At the end of a preceding inflating operation after a receiver has been filled with air to the set pressure, the lever 86 is in the position shown in dotted lines with the diaphragm 71 upheld by the air pressure in the chamber 42 overcoming the effective forces of the spring 93, and the valve 50 has been moved to closed position by its spring 56. The main valve 8 is maintained closed by its spring 26, with the air at inlet pressure acting both on the top of the diaphragm 13 by flowing between the piston 8 loosely fitted in its guide 15 and on the underside of said diaphragm by flowing through the passageway 5, dowel tube 36, and passageway 35 to the recess chamber beneath the diaphragm 13.

Assuming that it is desired to inflate an automobile tire to a pressure of 30 pounds per square inch, the operator turns the crank 96 to move an indicating pointer to the numeral "30" appearing upon the face of the dial 98. The operator then presses the air chuck 77 upon the valve stem of the automobile tire which opens the tire valve and likewise moves the valve in the air chuck to open position against the air pressure in the hose 76. If the pressure in the tire is below the set pressure of 30 pounds, the air under higher pressure in the hose 76, air passageways 75 and 7, and main diaphragm chamber 42 equalizes with the pressure in the tire, thereby reducing the pressure in the chamber 42 and the spring 93 moves the lever 86 counterclockwise to the position shown in full lines. Such counterclockwise movement of the lever 86 causes the short arm 88 to depress the stud 90 of the plate 91 to deflect the diaphragm 71 to the position shown in Fig. I.

The downward movement of the diaphragm 71 causes the plate 70 to engage the enlarged head 67 of the screw stud 66 to move the latter downwardly, rocking the yoke lever 62.

The screw stud 66 is in engagement with the valve stem 51 of the valve 50, and movement downwardly of said screw stud 66 moves the valve 50 to open position, as shown in Figs. I and II. The opening of the valve 50 permits the air under high pressure in the chamber beneath the diaphragm 13 to be vented through the air passageway 72, dowel tube 73, air passageway 43, valve seat 49, and hollow valve shell 46 and openings 54 at the top thereof to the chamber 42, and thence to the dispensing hose 76, etc. The lowering of the pressure in the chamber beneath the diaphragm 13 unbalances the pressures on the opposite sides of the diaphragm and permits the high pressure air of the inlet passageway 4 acting on the top of the diaphragm to overcome the effective forces of the spring 26 and move the diaphragm 13 and valve 8 to the open position, as shown in Fig. I. Such opening movement of the diaphragm 13 is limited by the stop plate 24, carried by said diaphragm, coming into engagement with the annular shoulder 23.

In such open position with the main valve 8 open, air at source pressure flows in a surge to the tire through the passageways 4, 7, outlet passageway 75, hose 76, open chuck valve 77, through the valve stem of the automobile tire. During the time when the valve 8 is in open position, air at source pressure also flows upwardly through the air passageway 7 to the chamber 42 to raise the pressure therein to a degree sufficient to overcome the effective forces of the spring 93 and raise the diaphragm 71 to move the lever 86 clockwise. Such upward movement of the diaphragm 71 moves the plate 70 out of engagement with the enlarged head 67 of the screw stud 66 and permits the valve 50 to be closed by the action of its spring 56, rocking the lever yoke 62 in an upwardly and counterclockwise direction.

When the valve 50 is in closed position, communication between the chamber beneath the diaphragm 13 and the chamber 42 is shut off. However, the main valve 8 is still open and air at high pressure continues to flow both into the receiver and through the passageway 5, dowel tube 36, and passageway 35, restricted by the adjusting screw 38 into the chamber beneath the diaphragm 13. When the pressure in said chamber beneath the diaphragm rises to a degree, coupled with the effective forces of the spring 26, sufficient to overcome the pressure on the top of the diaphragm, the diaphragm 13, carrying the valve 8, is moved upwardly to close the valve 8 on its valve seat 9 at the lower end of the air passageway 7, and thus shut off the flow of air to the receiver.

The pressure of air in the chamber 42 equalizes with the pressure in the receiver by flowing through the passageway 75, hose 76, etc., and if the pressure has not yet reached that to which the device is set, the effective forces of the spring 93 again move the lever 86 counterclockwise to again depress the diaphragm 71 which again causes an opening of the valve 50 resulting in another opening of the valve 8 to allow another surge of air to flow to the receiver, as described above.

However, when the pressure in the tire reaches the pressure for which the device is adjusted, the pressure in the chamber 42 is sufficient to retain the lever 86 in the position shown in dotted lines in which the diaphragm 71 is in raised position and the valve 50 closed by action of its spring 56. Accordingly, the valve 8 remains closed and any further communication of the air under high pressure from the inlet passageway 4 to the outlet passageway 75 is prevented. Thereupon, the operator removes the air chuck 77 from the stem of the tire and the air under pressure in the hose 76 holds the valve of the air chuck closed. Of course, when the air chuck is removed from the valve stem of the automobile tire, the spring of the valve therein moves that valve to closed position and retains the desired set pressure of air in the tire.

It is to be noted that the time which the valve 8 is in open position to allow a surge of high pressure air to flow to the receiver may be varied by changing the restriction of the passageway 35 leading to the chamber beneath the diaphragm 13. With the passageway 35 restricted to a greater extent by the screw 38, a longer time is required before the air pressure in said chamber beneath the diaphragm 13 is raised to a degree sufficient to move the diaphragm 13 and valve 8 upwardly to closed position. Decreasing the restriction of the passageway 35 shortens the time period required to raise the air pressure in the chamber beneath the diaphragm 13 to a degree sufficient to move said diaphragm and valve to closed position.

The time which the valve 8 is in open position may be varied also by changing the setting of the adjusting screw 29, in engagement with the spring follower 28, to vary the loading of the diaphragm spring 26. When the diaphragm and valve 8 are loaded to a greater degree, the valve 8 will be moved to closed position with a wider differential between the pressures on the top and bottom of the diaphragm. Conversely, with a lesser degree of spring loading, said diaphragm and valve are moved to closed position with a smaller differential between the pressures on the top and bottom of the diaphragm 13.

Although I have shown my invention as applied to a tire-flator of the type which includes a pivoted lever and spring, it is obvious that my invention may be applied readily to tireflators of the type such as is shown in Morley Letters Patent No. 2,217,288, granted October 8, 1940, and wherein a lever of scale beam character, having a counterweight adapted to be adjustably moved thereon, functions in a manner equivalent to the lever and spring means described herein.

Therefore, I do not desire to limit myself to the precise details of construction and arrangement above set forth, as it is obvious that various modifications may be made therein without departing from the essential features of my invention, as defined in the appended claims.

I claim:

1. In fluid dispensing apparatus; the combination of a first conduit adapted for connection with a source of fluid under pressure; a second conduit adapted for connection with a receiver; a diaphragm; a main valve, carried by said diaphragm, between said first and second conduits; a first diaphragm chamber at the upper side of said diaphragm; a continually open passageway between said first conduit and said first diaphragm chamber; a second diaphragm chamber at the underside of said diaphragm; a continually open passageway between said first conduit and said second diaphragm chamber, including means to vary the effective size of said passageway; a second diaphragm; loading means for said second diaphragm; a third diaphragm chamber for said second diaphragm; a continually open passageway between said third diaphragm chamber and said conduit adapted for connection with a receiver; a bypass conduit between said second diaphragm chamber and said third diaphragm chamber; and means, operated by said second diaphragm, for controlling the flow of fluid through said bypass conduit.

2. In fluid dispensing apparatus; the combination of a first conduit adapted for connection with a source of fluid under pressure; a second conduit adapted for connection with a receiver; a spring loaded diaphragm; means for adjustably varying the spring loading of said diaphragm; a main valve, carried by said diaphragm, between said first and second conduits; a first diaphragm chamber at the upper side of said diaphragm; a continually open passageway between said first conduit and said first diaphragm chamber; a second diaphragm chamber at the underside of said diaphragm; a continually open passageway between said first conduit and said second diaphragm chamber, including means to vary the effective size of said passageway; a second diaphragm; loading means for said second diaphragm; a third diaphragm chamber for said second diaphragm; a continually open passageway between said third diaphragm chamber and said conduit adapted for connection with a receiver; a bypass conduit between said second diaphragm chamber and said third diaphragm chamber; and means, operated by said second diaphragm, for controlling the flow of fluid through said bypass conduit.

3. In fluid dispensing apparatus; the combination of a first conduit adapted for connection with a source of fluid under pressure; a second conduit adapted for connection with a receiver; a spring loaded diaphragm; means for adjustably varying the spring loading of said diaphragm; a main valve, carried by said diaphragm, between said first and second conduits; a first diaphragm chamber at the upper side of said diaphragm; a continually open passageway between said first conduit and said first diaphragm chamber; a second diaphragm chamber at the underside of said diaphragm; a continually open passageway between said first conduit and said second diaphragm chamber, including means to vary the effective size of said passageway; a second diaphragm; loading means for said second diaphragm; a third diaphragm chamber for said second diaphragm; a continually open passageway between said third diaphragm chamber and said conduit adapted for connection with a receiver; a bypass conduit between said second diaphragm chamber and said third diaphragm chamber; and valve means, operated by said second diaphragm, for controlling the flow of fluid through said bypass conduit.

DAVID S. WILLSON.